(12) United States Patent
Chundrlik, Jr. et al.

(10) Patent No.: US 11,027,654 B2
(45) Date of Patent: Jun. 8, 2021

(54) VEHICLE VISION SYSTEM WITH COMPRESSED VIDEO TRANSFER VIA DSRC LINK

(71) Applicant: MAGNA ELECTRONICS INC., Auburn Hills, MI (US)

(72) Inventors: William J. Chundrlik, Jr., Rochester Hills, MI (US); Krishna Koravadi, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 550 days.

(21) Appl. No.: 15/367,226

(22) Filed: Dec. 2, 2016

(65) Prior Publication Data

US 2017/0158133 A1 Jun. 8, 2017

Related U.S. Application Data

(60) Provisional application No. 62/263,187, filed on Dec. 4, 2015.

(51) Int. Cl.
| | |
|---|---|
| *H04N 7/18* | (2006.01) |
| *B60R 1/00* | (2006.01) |
| *H04N 21/414* | (2011.01) |
| *H04N 21/81* | (2011.01) |

(52) U.S. Cl.
CPC .......... *B60R 1/00* (2013.01); *B60R 2300/105* (2013.01); *B60R 2300/205* (2013.01); *B60R 2300/406* (2013.01); *B60R 2300/50* (2013.01); *H04N 21/41422* (2013.01); *H04N 21/814* (2013.01)

(58) Field of Classification Search
CPC ........................ H04N 21/41422; H04N 21/814

USPC .......................................................... 725/75
See application file for complete search history.

(56) References Cited

U.S. PATENT DOCUMENTS

| | | | |
|---|---|---|---|
| 4,910,793 A | * | 3/1990 | Mainardi ................ B61L 3/227 246/7 |
| 5,550,677 A | | 8/1996 | Schofield et al. |
| 5,670,935 A | | 9/1997 | Schofield et al. |
| 5,760,962 A | | 6/1998 | Schofield et al. |
| 5,786,772 A | | 7/1998 | Schofield et al. |
| 5,796,094 A | | 8/1998 | Schofield et al. |
| 5,877,897 A | | 3/1999 | Schofield et al. |
| 5,929,786 A | | 7/1999 | Schofield et al. |
| 5,949,331 A | | 9/1999 | Schofield et al. |
| 6,201,642 B1 | | 3/2001 | Bos |

(Continued)

FOREIGN PATENT DOCUMENTS

WO    WO2011/090484    7/2011

*Primary Examiner* — Jivka A Robovianski
(74) *Attorney, Agent, or Firm* — Honigman LLP

(57) ABSTRACT

A communication system for vehicles includes a camera disposed at a first vehicle and having a field of view exterior of the first vehicle. The camera captures image data. A first communication device disposed at the first vehicle wirelessly transmits image data captured by the camera. A second communication device disposed at a second vehicle receives the transmitted captured image data from the first communication device. At least one of (i) an image processor disposed at the second vehicle processes the received transmitted captured image data for a driver assistance system of the second vehicle and (ii) a display of the second vehicle displays images derived from the received transmitted captured image data for viewing by a driver of the second vehicle.

18 Claims, 3 Drawing Sheets

(56) References Cited

U.S. PATENT DOCUMENTS

| | | |
|---|---|---|
| 6,302,545 B1 | 10/2001 | Schofield et al. |
| 6,396,397 B1 | 5/2002 | Bos et al. |
| 6,405,132 B1 | 6/2002 | Breed et al. |
| 6,498,620 B2 | 12/2002 | Schofield et al. |
| 6,523,964 B2 | 2/2003 | Schofield et al. |
| 6,587,186 B2 | 7/2003 | Bamji et al. |
| 6,611,202 B2 | 8/2003 | Schofield et al. |
| 6,636,258 B2 | 10/2003 | Strumolo |
| 6,674,895 B2 | 1/2004 | Rafii et al. |
| 6,678,039 B2 | 1/2004 | Charbon |
| 6,690,268 B2 | 2/2004 | Schofield et al. |
| 6,690,354 B2 | 2/2004 | Sze |
| 6,693,517 B2 | 2/2004 | McCarthy et al. |
| 6,710,770 B2 | 3/2004 | Tomasi et al. |
| 6,802,617 B2 | 10/2004 | Schofield et al. |
| 6,806,452 B2 | 10/2004 | Bos et al. |
| 6,822,563 B2 | 11/2004 | Bos et al. |
| 6,825,455 B1 | 11/2004 | Schwarte |
| 6,876,775 B2 | 4/2005 | Torunoglu |
| 6,882,287 B2 | 4/2005 | Schofield |
| 6,891,563 B2 | 5/2005 | Schofield et al. |
| 6,906,793 B2 | 6/2005 | Bamji et al. |
| 6,919,549 B2 | 7/2005 | Bamji et al. |
| 6,946,978 B2 | 9/2005 | Schofield |
| 6,975,246 B1 | 12/2005 | Trudeau |
| 7,005,974 B2 | 2/2006 | McMahon et al. |
| 7,038,577 B2 | 5/2006 | Pawlicki et al. |
| 7,053,357 B2 | 5/2006 | Schwarte |
| 7,145,519 B2 | 12/2006 | Takahasi et al. |
| 7,157,685 B2 | 1/2007 | Bamji et al. |
| 7,161,616 B1 | 1/2007 | Okamoto et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,230,640 B2 | 6/2007 | Regensburger et al. |
| 7,248,283 B2 | 7/2007 | Takagi et al. |
| 7,283,213 B2 | 10/2007 | O'Connor et al. |
| 7,295,229 B2 | 11/2007 | Kumata et al. |
| 7,301,466 B2 | 11/2007 | Asai |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,580,795 B2 | 8/2009 | McCarthy et al. |
| 7,592,928 B2 | 9/2009 | Chinomi et al. |
| 7,720,580 B2 | 5/2010 | Higgins-Luthman |
| 7,855,755 B2 | 12/2010 | Weller et al. |
| 7,859,565 B2 | 12/2010 | Schofield et al. |
| 7,881,496 B2 | 2/2011 | Camilleri et al. |
| 8,013,780 B2 | 9/2011 | Lynam |
| 8,027,029 B2 | 9/2011 | Lu et al. |
| 9,688,199 B2 | 6/2017 | Koravadi |
| 2003/0095039 A1 | 5/2003 | Shimomura et al. |
| 2006/0254142 A1 | 11/2006 | Das et al. |
| 2008/0068455 A1* | 3/2008 | Pratt ................. B60R 1/00 348/118 |
| 2009/0033474 A1 | 2/2009 | Chen |
| 2010/0085171 A1 | 4/2010 | Do |
| 2010/0245066 A1 | 9/2010 | Sarioglu |
| 2011/0032119 A1 | 2/2011 | Pfeiffer et al. |
| 2012/0062743 A1 | 3/2012 | Lynam et al. |
| 2012/0065858 A1 | 3/2012 | Nickolaou et al. |
| 2012/0218412 A1 | 8/2012 | Dellantoni et al. |
| 2013/0116859 A1 | 5/2013 | Ihlenburg et al. |
| 2013/0222592 A1* | 8/2013 | Gieseke ................. G08G 1/04 348/148 |
| 2013/0342333 A1 | 12/2013 | Hutchings |
| 2014/0218529 A1 | 8/2014 | Mahmoud |
| 2014/0222323 A1 | 8/2014 | Purushothaman et al. |
| 2014/0375476 A1 | 12/2014 | Johnson |
| 2015/0124096 A1 | 5/2015 | Koravadi |
| 2015/0158499 A1 | 6/2015 | Koravadi |
| 2015/0251599 A1 | 9/2015 | Koravadi |
| 2015/0352953 A1 | 12/2015 | Koravadi |
| 2016/0019497 A1* | 1/2016 | Carvajal ............... G06Q 10/08 701/519 |
| 2016/0036917 A1 | 2/2016 | Koravadi et al. |
| 2016/0048966 A1* | 2/2016 | Kuehnle ................. G06T 5/50 348/38 |
| 2016/0210853 A1 | 7/2016 | Koravadi |
| 2016/0381571 A1 | 12/2016 | Koravadi et al. |
| 2017/0011633 A1 | 1/2017 | Boegel |
| 2017/0222311 A1 | 8/2017 | Hess |
| 2017/0254873 A1 | 9/2017 | Koravadi et al. |
| 2017/0276788 A1 | 9/2017 | Wodrich |
| 2017/0315231 A1 | 11/2017 | Wodrich |

* cited by examiner

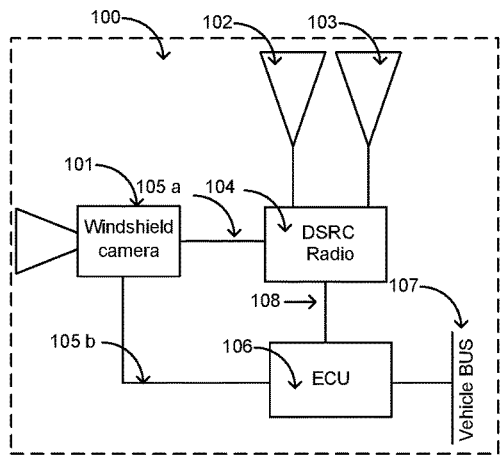
FIG. 3
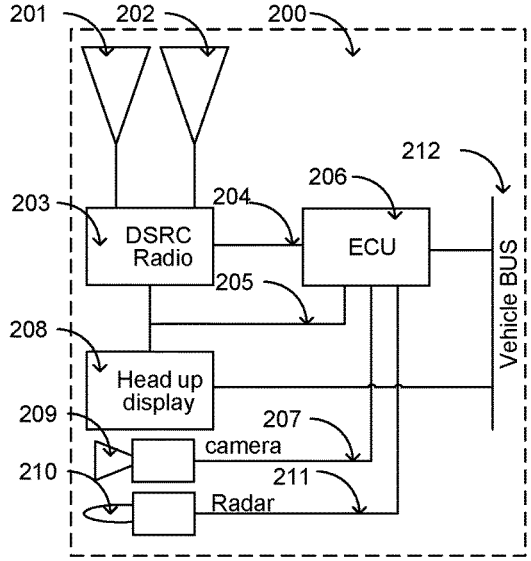
FIG. 4
FIG. 2

VEHICLE VISION SYSTEM WITH COMPRESSED VIDEO TRANSFER VIA DSRC LINK

CROSS REFERENCE TO RELATED APPLICATION

The present application claims the filing benefits of U.S. provisional application Ser. No. 62/263,187, filed Dec. 4, 2015, which is hereby incorporated herein by reference in its entirety.

FIELD OF THE INVENTION

The present invention relates generally to a vision system for a vehicle and, more particularly, to a vehicle vision system that utilizes one or more cameras at a vehicle and that utilizes a communication device to communicate with other vehicles.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

Recently developed Dedicated Short Range Communication (DSRC) radio technology (as known in the art) enables communications-based active safety systems. Communication links for such applications need to be reliable, high speed, low latency links that are immune to extreme weather conditions and that work reliably in high speed mobility conditions and multipath roadway environments.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and uses a dedicated short range communication (DSRC) radio of the vehicle to communicate compressed video images to a DSRC radio of another vehicle.

The system of the present invention may be used as part of a platooning group of vehicles (driving close together along a road), where compressed video images (captured by a forward viewing camera of the lead vehicle) are communicated to following vehicles, where the compressed video images or image data may be processed (by a machine vision processor) for use in advanced driver assistance systems (ADAS) or may be displayed at a display screen of the following vehicle so the driver of the following vehicle can view the path ahead of the lead vehicle.

Optionally, the system of the present invention may be used to assist a driver in towing a trailer with a vehicle. One or more cameras of the trailer may capture video images exterior of and surrounding the trailer (or optionally inside the trailer) and a DSRC radio of the trailer may communicate the captured images to a communication link and control of the towing vehicle, whereby the captured video images may be displayed at a display screen in the towing vehicle for the driver to view during a driving maneuver (such as during a reversing maneuver). Optionally, the control of the towing vehicle may process captured and communicated image data to detect objects in the exterior field(s) of view of the trailer camera(s), and the system may generate an alert to the driver of the vehicle if a detected object is determined to be a potential hazard or obstacle during the driving maneuver.

These and other objects, advantages, purposes and features of the present invention will become apparent upon review of the following specification in conjunction with the drawings.

BRIEF DESCRIPTION OF THE DRAWINGS

FIG. 2 shows the DSRC frequency spectrum allocation in the United States;

FIGS. 3 and 4 are schematics showing the system architecture with DSRC radios used for compressed video transfer from a lead vehicle to a following vehicle in a platooning use case in accordance with the present invention.

LEGEND

Figure 1:
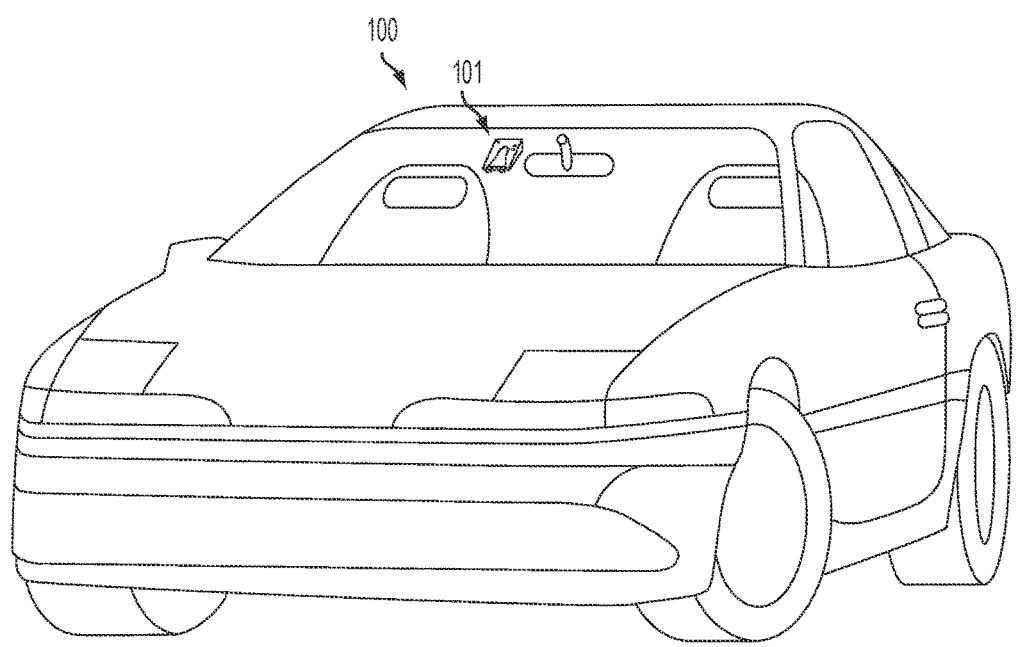
FIG. 1 is a perspective view of a vehicle with a vision system that incorporates at least one camera in accordance with the present invention.

100 Lead vehicle having system elements for platooning vehicle system
101 Front windshield camera unit
102 DSRC antenna for safety radio channel
103 DSRC antenna for non-safety radio channel
104 Dual channel DSRC radio unit
105a Compressed video connection between the windshield camera and DSRC radio
105b Object/lane data from the windshield camera to the electronic control unit used by other ADAS features
106 ECU running ADAS features and utilizing the safety data received from the DSRC radio (104) and windshield camera (101)
107 Vehicle BUS for ECU running the ADAS features to use to interact with other modules in the vehicle
108 Communication link between ECU (106) and DSRC radio (104)
200 Following vehicle having system architecture elements for platooning vehicle system
201 DSRC antenna for non-safety radio channel
202 DSRC antenna for safety radio channel
203 Dual channel DSRC radio unit
204 Object/lane data from the windshield camera to the ECU used by other ADAS features
205 Compressed video connection between the windshield camera and DSRC radio and Heads Up Display module (208)
206 ECU hosting ADAS features
207 Communication link between the camera (209) and the ECU (206)
208 Heads up display utilized to show the compressed video received from the lead vehicle
209 Windshield camera mounted in the following vehicle and used for the ADAS features
210 Optional radar mounted on the following vehicle for use with the ADAS features
211 Communication link between radar and the ECU hosting ADAS features 212 Vehicle BUS for ECU running the ADAS features and Heads up Display module to use to interact with other modules in the vehicle
300 A towing vehicle having system elements and towing a trailer
301 Display unit displaying the video stream received via DSRC radio
302 DSRC antenna for non-safety radio channel
303 DSRC antenna for safety radio channel
304 Dual channel DSRC radio unit
305 DSRC antenna connected to the DSRC radio (306)
306 DSRC radio connected to a camera unit (307)
307 Camera unit mounted at the trailer (308) to monitor in-cabin, trailer backup or trailer surround view
308 Trailer having system elements and equipped with surround view/in-cabin monitoring camera(s) connected with at least one DSRC radio module
309 Vehicle BUS for the display monitor module and DSRC radio unit to use to interact with other modules in the vehicle

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Referring now to the drawings and the illustrative embodiments depicted therein, a vehicle 100 includes an imaging system or vision system that includes a forward viewing camera module 101 that is disposed at and views through the windshield of the vehicle and captures image data of the scene exterior and forward of the vehicle (FIG. 1). The camera module includes a lens for focusing images at or onto an imaging array or imaging plane or imager of the camera. The forward viewing camera views through the windshield and forward of the vehicle, such as for a machine vision system (such as for traffic sign recognition, headlamp control, pedestrian detection, collision avoidance, lane marker detection and/or the like). The vision system includes a control or electronic control unit (ECU) or processor that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

Even though the main purpose of the DSRC technology is designed for the safety applications in the automotive domain, it is also designed for the no-safety use one of such application could be compressed video transfer. In the U.S., channels 178, 172 and 184 are reserved for safety applications and other SCH channels could be used for non-safety applications (the layout of the DSRC spectrum in the U.S. is shown in FIG. 2).

One use case is in a platooning vehicle situation, where vehicles will follow very close to each other and the vehicles following the lead vehicle cannot see the road path ahead (such as platooning vehicles utilizing aspects of the systems described in U.S. patent application Ser. No. 15/203,840, filed Jul. 7, 2016, now U.S. Pat. No. 10,115,314, which is hereby incorporated herein by reference in its entirety). Also, the driver in a following vehicle may only see the vehicle directly in front of his or her vehicle and cannot see the path and obstacles ahead of and in the path of the lead vehicle. In case of an emergency, if the lead vehicle does not react and/or the following vehicles do not react in time, a multi-vehicle collision may result as the following vehicles will also end up in an accident with the lead vehicle. This situation could be prevented if the drivers in the following vehicles could see the road ahead and monitor the platooning system and take necessary action if the system fails to react.

Other use cases may be for trailer backup assist. It is very difficult to back up a trailer attached to a vehicle without the backside or side view of the trailer. Ultrasonic sensors may be installed in the trailer to detect an obstacle and alert the driver. Preferably, the driver may view the surroundings or environment around the trailer during trailer backup.

The present invention provides a method and apparatus to utilize the DSRC infrastructure for the non-safety use cases such as wireless video transfer.

To solve the issue discussed above with platooning vehicles, the DSRC infrastructure may be used to transmit compressed video images captured by the lead vehicle's windshield camera, whereby the compressed video images are transmitted back to the following vehicles and the video images showing the path ahead of the lead vehicle may be displayed to the driver on a display (such as a heads up display or HUD) of each or at least some of the following vehicles. Also, the windshield camera module (having an image processor and control) mounted at the windshield of the following vehicle may process the video image data from the lead vehicle (via its image processor) to perform lane detection and obstacle detection using the video images or image data captured by the lead vehicle camera in addition to the distance measurement between the vehicles, such as shown in FIGS. 3 and 4.

FIGS. 3 and 4 are schematics of the DSRC radio infrastructure utilization for the non-safety and safety application in the platooning case in which the lead vehicle 100 (FIG. 3) is equipped with a dual channel DSRC radio 104, which includes a DSRC antenna 102 for a safety radio channel. The DSRC radio 104 receives the compressed video steam from the windshield camera 101 via a communication link 105a, and the captured video images are compressed and transmitted (via an antenna 103) to the following vehicle utilizing a SCH non-safety communication channel and antenna 103 (FIG. 2). The lead vehicle may also include a control or ECU 106 that receives image data 105b captured by the windshield camera 101 for use by other ADAS features, such as lane detection or object detection or the like (and with the control optionally controlling or communicating with other vehicle systems via a vehicle communication or network bus 107). The control 106 may also communicate (via a communication link 108, which may be a wired or wireless communication link or may be via the vehicle communication or network bus) information to the DSRC radio 104, which may transmit such information to the other vehicles (or the control may receive information from the DSRC radio via link 108, such as safety or emergency information or other information communicated to the DSRC radio and received by one of the antennae 102, 103 of the DSRC radio).

The vehicle (or vehicles) 200 (FIG. 4) following the lead vehicle 100 is also equipped with a dual channel DSRC radio 203, which receives the compressed video images from the lead vehicle (via SCH non-safety communication channel and antenna 201) and transmits or communicates the received video stream to the HUD unit 208 to display the video on the HUD unit 208 of the following vehicle 200. The DSRC 203 also includes a DSRC antenna 202 for a safety radio channel. The DSRC radio unit 203 also transmits (via communication link 204, which may be a wired or wireless communication link or may be via the vehicle communication or network bus 212) the compressed video to a control or ECU 206 of the following vehicle 200 and the control 206 may process the compressed video image data to perform object and lane detection, which may be used by the ADAS/active safety features of the following vehicle 200.

The control 206 may optionally control or communicate with other vehicle systems via a vehicle communication or network bus 212. The control may also be in communication with the display 208 via link 205 (which may be a wired or wireless communication link or may be via the vehicle communication or network bus). The control 206 processing the video image data transmitted by the lead vehicle DSRC radio acts like a redundant monitoring unit that could control the vehicle 200 following the lead vehicle in case the lead vehicle fails to react in case of an emergency situation. The driver in the vehicle following the lead vehicle may also view the displayed video images (from the lead vehicle camera) to monitor the path and take necessary action in case of emergency if the lead vehicle fails to react.

As shown in FIG. 4, the following vehicle 200 may also include a camera 209 (such as a forward viewing camera disposed at and behind the windshield of the vehicle) that communicates captured image data 207 to the control or ECU 206. The following vehicle may also include a radar sensor 210 that communicates sensor data 211 to the control or ECU 206. The control may process the captured image data 207 and/or sensor data 211 for ADAS features or functions of the following vehicle 200.

Figure 5:
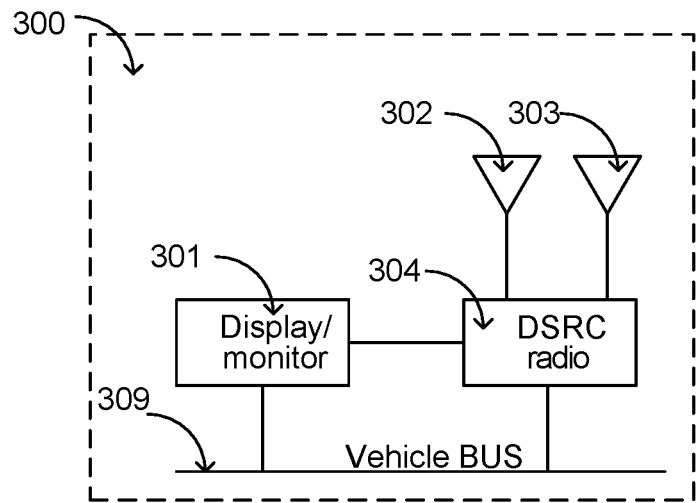
FIGS. 5 and 6 are schematics showing the system architecture with multiple DSRC radios used for compressed video transfer from cameras mounted on a trailer to a vehicle that is towing the trailer in accordance with the present invention.
Figure 6:
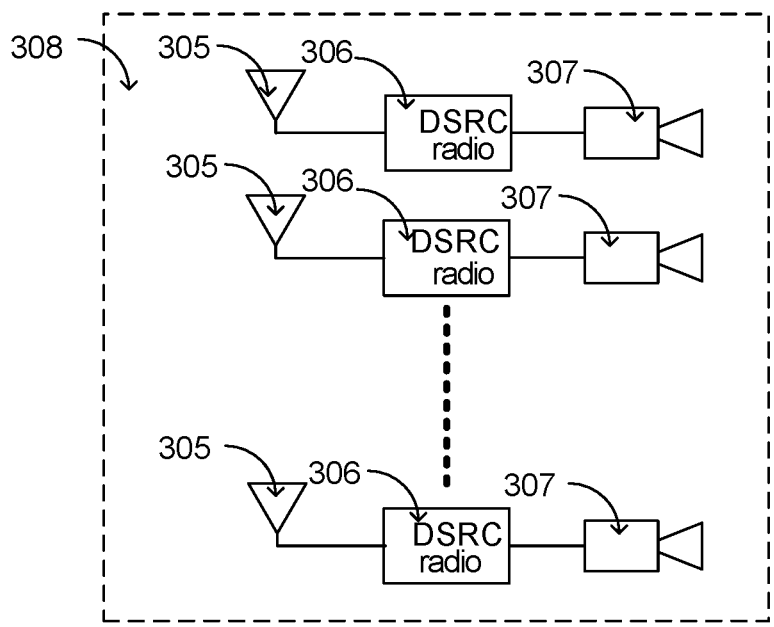

To solve the issue discussed above with trailer backup situations, the DSRC infrastructure may be used to transmit compressed video images captured by one or more cameras mounted on the trailer and viewing the trailer's surroundings, such as shown in FIGS. 5 and 6. Optionally, the inside environment of the trailer could be monitored if a camera is mounted inside the trailer cabin and the video images captured by the inside camera are transmitted to the vehicle display system via the DSRC wireless link.

FIGS. 5 and 6 are schematics of the DSRC radio infrastructure utilization for the non-safety and safety application to monitor the internal and external environment of a trailer 308 (FIG. 6) attached to the towing vehicle (FIG. 5) or other similar applications. A trailer 308 (FIG. 6) is installed with camera(s) 307 to monitor the internal or external environment, and the compressed video images from the camera(s) 307 are wirelessly transmitted via a DSRC radio 306 and antenna 305 to the vehicle 300 (FIG. 5) that is towing the trailer, utilizing a non-safety DSRC channel. The vehicle 300 is equipped with a dual channel DSRC radio 304 that has a dedicated radio channel and antenna 303 for the safety applications and a non-safety radio channel and an antenna 302 for non-safety applications. DSRC radio 304 may communicate with other modules in the vehicle via the vehicle communication or network bus 309 for the safety related data and may transmit the compressed video images received via the non-safety DSRC channel to the display/monitor/radio unit 301. The driver of the vehicle may use the exterior trailer camera data displayed on the unit 301 to see the external environment of the trailer to park the trailer safely and may optionally select the in-cabin camera unit for display so as to monitor the internal environment of the trailer.

Therefore, the present invention comprises a vehicle vision system that utilizes a DSRC communication to transmit or communicate compressed video image data (as captured by a camera of the vehicle) to a system or processor of another vehicle, where the system or processor of the other vehicle may display the captured images or may process the captured image data for a function of the other vehicle. Thus, the present invention provides for an enhanced view to a driver of a following vehicle in a platoon of vehicles of the road ahead of the lead vehicle. Optionally, the present invention may provide for an enhanced view to a driver of a vehicle of the surroundings of a trailer being towed by the vehicle, via use of images or image data captured by one or more cameras at the trailer.

The system may utilize sensors, such as radar or lidar sensors or the like. The sensing system may utilize aspects of the systems described in U.S. Pat. Nos. 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484 and/or U.S. Publication No. US-2010-0245066 and/or U.S. provisional applications, Ser. No. 62/375,161, filed Aug. 15, 2016, Ser. No. 62/361,586, filed Jul. 13, 2016, Ser. No. 62/359,913, filed Jul. 8, 2016, Ser. No. 62/349,874, filed Jun. 14, 2016, Ser. No. 62/330,557, filed May 2, 2016, Ser. No. 62/313,279, filed Mar. 25, 2016, Ser. No. 62/303,546, filed Mar. 4, 2016, and/or Ser. No. 62/289,441, filed Feb. 1, 2016, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The camera system or camera module of the present invention may utilize aspects of the systems and/or modules described in International Publication Nos. WO 2013/123161 and/or WO 2013/019795, and/or U.S. Pat. Nos. 8,256,821; 7,480,149; 7,289,037; 7,004,593; 6,824,281; 6,690,268; 6,445,287; 6,428,172; 6,420,975; 6,326,613; 6,278,377; 6,243,003; 6,250,148; 6,172,613 and/or 6,087,953, and/or U.S. Publication Nos. US-2015-0327398; US-2014-0226012 and/or US-2009-0295181, which are all hereby incorporated herein by reference in their entireties. Optionally, the vision system may include a plurality of exterior facing imaging sensors or cameras, such as a rearward facing imaging sensor or camera, a forwardly facing camera at the front of the vehicle, and sidewardly/rearwardly facing cameras at respective sides of the vehicle, which capture image data representative of the scene exterior of the vehicle.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A communication system for vehicles, said communication system comprising:
   a camera disposed at a first vehicle and having a field of view exterior of the first vehicle, said camera capturing image data;
   a first communication device disposed at the first vehicle, said first communication device wirelessly transmitting image data captured by said camera;
   a second communication device disposed at a second vehicle, said second communication device receiving the transmitted captured image data from said first communication device; and
   wherein an image processor disposed at the second vehicle processes the received transmitted captured image data for a driver assistance system of the second vehicle.

2. The communication system of claim 1, wherein said first and second communication devices comprise first and second dedicated short range communication devices.

3. The communication system of claim 2, wherein each of said first and second dedicated short range communication devices have a first channel dedicated for safety related communications and a second channel dedicated for communication of the captured image data.

4. The communication system of claim 1, wherein the first vehicle comprises a trailer and the second vehicle comprises a towing vehicle that is towing the trailer.

5. The communication system of claim 4, wherein the trailer includes a an inside camera disposed inside the trailer that has a field of view inside the trailer, and wherein video images derived from image data captured by the inside camera are displayed at a display disposed at the second vehicle.

6. The communication system of claim 4, wherein said image processor of the towing vehicle processes the received transmitted image data captured by the camera of the trailer to detect objects exterior of the trailer.

7. The communication system of claim 4, wherein a display of the towing vehicle displays images derived from the received transmitted captured image data for viewing by a driver of the towing vehicle while the driver is driving the towing vehicle and towing the trailer.

8. The communication system of claim 1, wherein the first vehicle comprises a lead vehicle of a platoon of vehicles and wherein the second vehicle comprises at least one following vehicle of the platoon of vehicles that is following the lead vehicle.

9. The communication system of claim 8, wherein said camera comprises a forward viewing camera of the lead vehicle.

10. The communication system of claim 9, wherein said image processor of the following vehicle processes the received transmitted captured image data to detect objects exterior and ahead of the lead vehicle.

11. The communication system of claim 10, wherein said image processor processes the received transmitted captured image data for lane marker detection at the road ahead of the lead vehicle.

12. The communication system of claim 9, wherein a display of the following vehicle displays images derived from the received transmitted captured image data for viewing by a driver of the following vehicle.

13. The communication system of claim 9, wherein the second vehicle comprises a plurality of following vehicles following the lead vehicle, and wherein each of the following vehicles of the plurality of following vehicles comprises a second communication device for receiving the transmitted captured image data from said first communication device.

14. The communication system of claim 1, wherein said image processor disposed at the second vehicle processes the received transmitted captured image data for lane marker detection at the road ahead of the second vehicle.

15. The communication system of claim 1, wherein a display disposed at the second vehicle displays images derived from the received transmitted captured image data for viewing by a driver of the second vehicle.

16. A communication system for vehicles, said communication system comprising:
- a camera disposed at a first vehicle and having a field of view exterior of the first vehicle, said camera capturing image data;
- a first communication device disposed at the first vehicle, said first communication device wirelessly transmitting image data captured by said camera;
- a second communication device disposed at a second vehicle, said second communication device receiving the transmitted captured image data from said first communication device;
- wherein said first and second communication devices comprise first and second dedicated short range communication devices;
- wherein the first vehicle comprises a lead vehicle of a platoon of vehicles and wherein the second vehicle comprises at least one following vehicle of the platoon of vehicles that is following the lead vehicle;
- wherein said camera comprises a forward viewing camera of the first vehicle; and
- wherein an image processor of the second vehicle processes the received transmitted captured image data for a driver assistance system of the second vehicle, and wherein said image processor processes the received transmitted captured image data for lane marker detection at the road ahead of the first vehicle.

17. The communication system of claim 16, wherein each of said first and second dedicated short range communication devices have a first channel dedicated for safety related communications and a second channel dedicated for communication of the captured image data.

18. The communication system of claim 16, wherein a display of the second vehicle displays images derived from the received transmitted captured image data for viewing by a driver of the second vehicle.

* * * * *